United States Patent
Kent

[11] 3,754,376
[45] Aug. 28, 1973

[54] INERT GAS STRIPPING OF CONTAMINATED WATER

[75] Inventor: Robert D. Kent, Bellaire, Tex.

[73] Assignee: Texaco Inc., New York, N.Y.

[22] Filed: Feb. 1, 1972

[21] Appl. No.: 222,480

[52] U.S. Cl............... 55/51, 55/54, 55/70, 55/73
[51] Int. Cl........................ B01d 19/00, B01d 53/14
[58] Field of Search............... 55/46, 47, 48, 51–54, 55/70, 73, 84, 89, 196, 198

[56] References Cited
UNITED STATES PATENTS

| | | | |
|---|---|---|---|
| 2,141,349 | 12/1938 | Engelhardt | 55/51 |
| 3,020,138 | 2/1962 | Wethly | 55/70 X |
| 3,292,345 | 12/1966 | Wunderlich et al. | 55/46 |
| 3,335,071 | 8/1967 | Bollen et al. | 55/70 X |
| 3,556,716 | 1/1971 | Pollio et al. | 55/70 X |

Primary Examiner—Samih N. Zaharna
Assistant Examiner—Richard W. Burks
Attorney—Thomas H. Whaley et al.

[57] ABSTRACT

Water containing contaminating gases such as hydrogen sulfide, carbon dioxide and ammonia is freed of these contaminants by closed system stripping process which employs an inert gas and steam.

9 Claims, 2 Drawing Figures

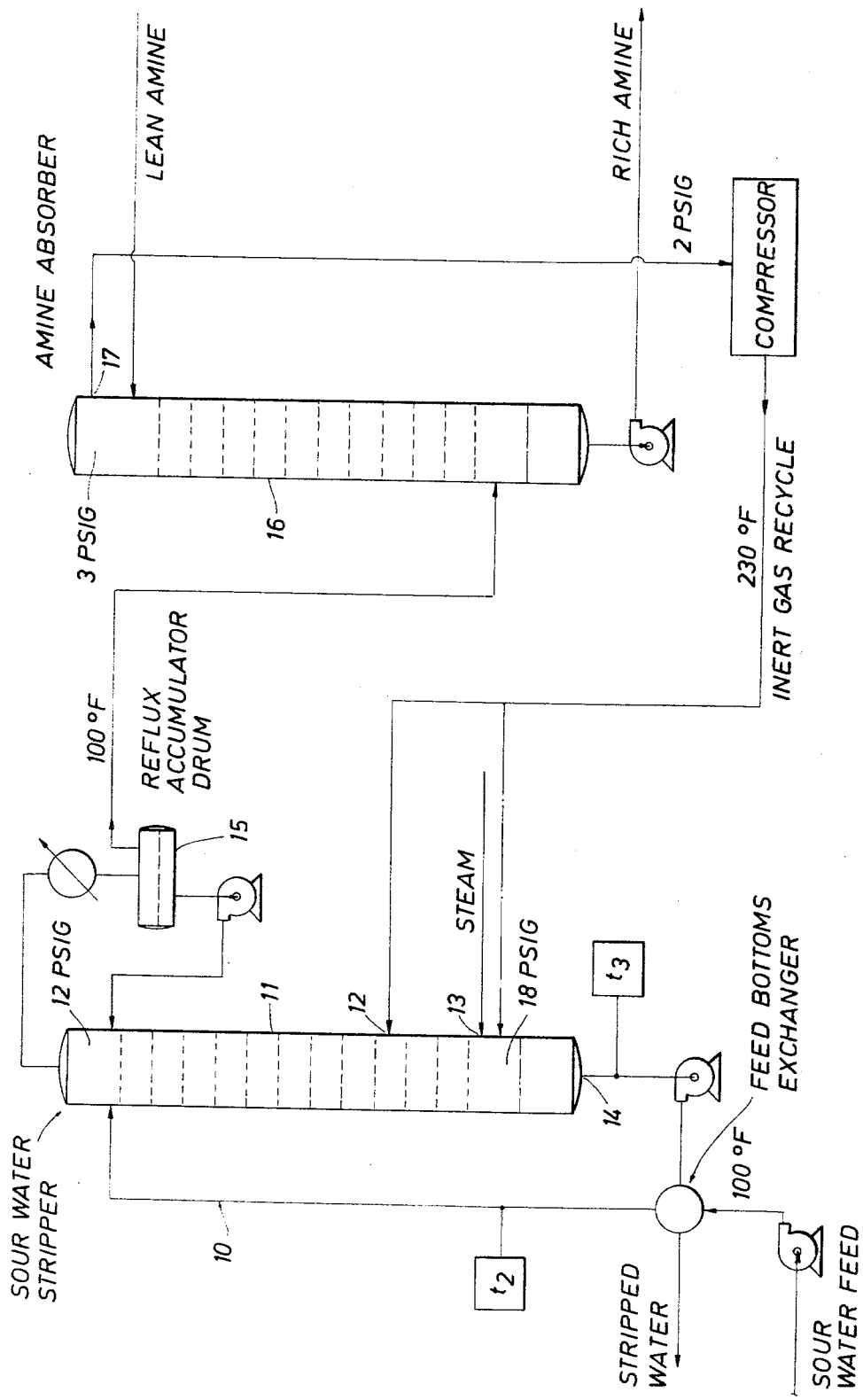

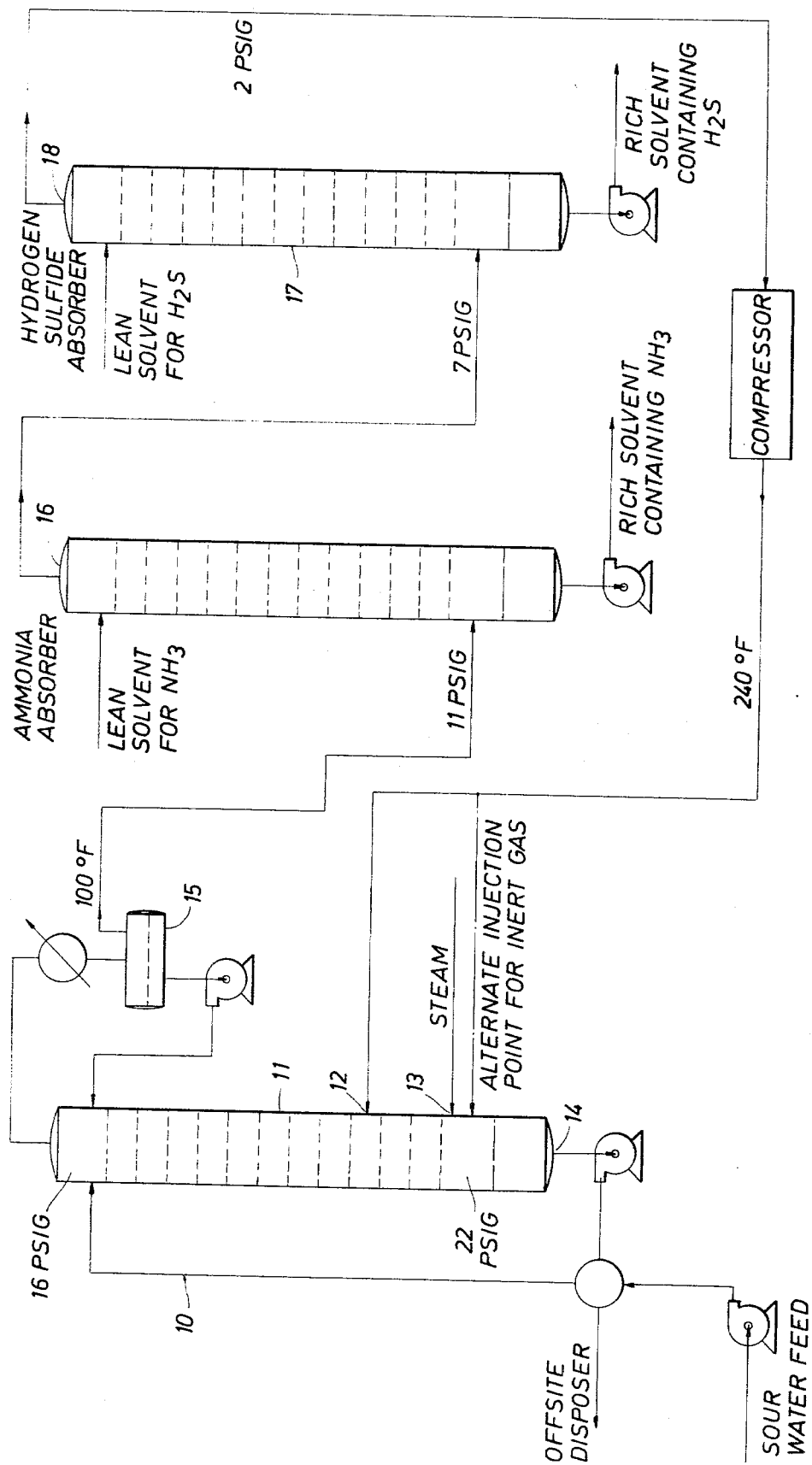
FIG. 2 CLOSED CYCLE INERT GAS STRIPPING SEPARATE ABSORBERS FOR AMMONIA AND HYDROGEN SULFIDE

INERT GAS STRIPPING OF CONTAMINATED WATER

BACKGROUND OF THE INVENTION

This invention concerns the field of separation processes. Specifically it concerns the field of separating contaminating gases from water. More specifically it concerns the use of a stripper to remove contaminating gases from water and one or more absorbers to recover these contaminants.

The effluent water from refinery and chemical processes often contains dissolved gases such as hydrogen sulfide, ammonia and carbon dioxide. These materials are pollutants and must be removed from water before it is discharged or is suitable for reuse. Until recently such pollutants have generally been removed by stripping with steam or less frequently with flue gas and the resultant overhead discharged to a fired heater or other burning equipment whereby the pollutants are incinerated and discharged from stacks. Lately, laws have been enacted in many areas whereby the amount of pollutants that may be so incinerated and discharged from stacks is strictly limited, generally requiring disposal of said pollutants by other means. One means that has recently come into use is to strip the water with steam as before but pass the stripper overhead gases containing the pollutants through one or more absorbers whereby the pollutants are absorbed for subsequent processing or disposal. In this manner the incineration of the pollutants is avoided and furthermore they can often be recovered as valuable by-products. Flue gas cannot generally be employed because of reactive materials present such as carbon dioxide, oxygen, sulfur dioxide and the like.

Prior to my invention steam alone was generally employed to strip these constituents from water. Steam stripping, however, has several disadvantages. Steam stripping is only satisfactory as long as the temperature of the stripper overhead can be maintained at a high enough level to carry overhead a substantial percentage of water vapor (generally 35 percent by volume or more) along with the hydrogen sulfide, ammonia and carbon dioxide. However, it is often necessary to reduce the overhead temperature due to processing requirements of the stripper overhead gas. As the overhead temperature drops the water vapor content of the stripper overhead becomes less and the overhead becomes highly concentrated in hydrogen sulfide, ammonia and carbon dioxide. This results in top tray accumulation of hydrogen sulfide, ammonia bisulfide and ammonium carbonate which makes separation to an ideal bottoms product in the order of one part per million (PPM) hydrogen sulfide difficult and substantially increases corrosion of the top tray. Also, plugging is likely to occur in the overhead lines and equipment due to deposition of ammonium salts (bisulfide, carbamate, bicarbonate, and carbonate). Also, since steam stripping involves the carryover of large quantities of water with the stripped gases a problem may occur downstream of the stripping tower with the absorbers which must dissolve the stripped gases. These absorbers are typically solvent systems which preferentially dissolve a given contaminant. If water is present it too may be dissolved to some extent in the solvents. Since these solvents are expensive and must be recycled, any water they pick up must be removed. This process of removing the water from the absorber solvents becomes increasingly difficult and more expensive if large amounts of water are dissolved in the solvents as is the case with steam stripping systems which must necessarily have large amounts of water in contact with the absorbers. These difficulties may be overcome by the process of my invention which briefly involves stripping contaminants from water using an inert gas mixed with steam in a closed system where the inert gas is recovered and reused by recycling with use of a compressor.

Use of an inert gas mixed with steam has an advantage over steam alone as a stripping medium because a larger partial pressure of inert gas relative to the partial pressure of ammonia, carbon dioxide and hydrogen sulfide may be obtained at a given temperature using some inert gas than would the partial pressure of steam alone relative to the partial pressure of ammonia, carbon dioxide and hydrogen sulfide at a given temperature. Thus, at a given temperature ammonia, carbon dioxide and hydrogen sulfide will be more efficiently stripped if some inert gas is present as a stripping medium. Also, solids will have less tendency to form when some inert gas is used as a stripping medium since the equilibrium between solids such as ammonium bisulfide and ammonium carbonate, for instance, will be more in favor of the gases making up the solids.

SUMMARY OF THE INVENTION

My invention is a process wherein dissolved gaseous contaminants are stripped from water containing dissolved amounts of these gases by an inert gas and steam mixture circulating in a closed system such that the mixture of inert gas and stripped gases is passed through absorbing means to separate the inert gas from the stripped gases. The inert gas is then recycled by means of a compressor to be reused for stripping purposes.

BRIEF DESCRIPTION OF THE DRAWINGS

FIG. 1 depicts a process of my invention in which one absorber is required to remove the contaminants from the stripping tower overhead stream. FIG. 2 depicts a process of my invention in which a plurality of absorbers is required to remove the contaminants from the stripping tower overhead stream.

DESCRIPTION OF THE PREFERRED EMBODIMENTS

The process of my invention may be better understood by reference to the attached drawings.

In a typical embodiment of my invention as shown in FIG. 1, water 10 containing contaminants including hydrogen sulfide, ammonia and carbon dioxide is introduced near the top tray of a conventional stripping tower 11. Inert gas enters the stripping tower at or near the bottom at 12. Steam is also introduced at or near the bottom of the stripping tower at 13. Alternately, heat may be applied to the bottoms by use of a reboiler or the like to generate steam from the bottoms liquid. The water stripped of contaminants leaves the bottom of the stripping tower at 14. The inert gas, steam, and stripped contaminants are routed through a condenser and reflux system 15 to increase the efficiency of the stripping tower. The inert gas and stripped contaminants (including hydrogen sulfide, ammonia and carbon dioxide) leave the stripping tower and the reflux accumulator drum and are passed through an absorber 16 wherein the hydrogen sulfide and ammonia are removed by a suitable solvent. The inert gas now relatively free of contaminants leaves the absorber at 17 and is reintroduced by means of a compressor to the original stripping tower at 12 and the process is repeated.

Another embodiment of the process of my invention is shown in FIG. 2. Water 10 containing contaminants including hydrogen sulfide, ammonia and carbon dioxide is introduced near the top tray of a conventional stripping tower 11. Inert gas enters the stripping tower near the bottom at 12. Steam is also introduced near the bottom of the stripping tower at 13. Alternately, heat may be applied to the bottoms by use of a reboiler or the like to generate steam from the bottoms liquid. The water stripped of contaminants leaves the bottom of the stripping tower at 14. The inert gas, steam and stripped contaminants are routed through a condenser and reflux system 15 to increase the efficiency of the stripping tower. The inert gas and stripped contaminants (including hydrogen sulfide, ammonia and carbon dioxide) leave the stripping tower and its reflux accumulator drum and are passed through an absorber 16 wherein a solvent removes the ammonia. The remaining gases pass through another absorber 17 wherein another solvent removes the hydrogen sulfide. The inert gas now relatively free of contaminants leaves the hydrogen sulfide absorber at 18 and is reintroduced to the original stripping tower at 12.

The inert gas used in my invention must be unreactive with any of the contaminating constituents in the water or the solvents used in the absorbers. Inert gas is expensive relative to steam and has not been widely used for stripping purposes heretofore dispite its operational advantages. My invention avoids the economic problems of inert gas by recycling and reusing the inert gas by use of a compressor.

The inert gases suitable for use in the process of my invention include, for example, nitrogen and hydrogen. In certain cases carbon dioxide would be inert and could be used. An especially preferred gas is nitrogen.

The process of my invention does not ordinarily use inert gas alone. Some steam is generally required in addition to the inert gas as a stripping medium. The amount of steam relative to the total of steam and inert gas may range from 10 to 85 mole percent. Table A shows conditions for stripping tower operation using various mixtures of steam and nitrogen as stripping mediums. The use of steam alone is also shown for comparative purposes. From the table it may be noted that the reflux drum temperature is lower when using inert gas than when steam alone is used. The lack of requirement of high temperature alleviates the problems of corrosion and solids formation which occur when steam alone is used as a stripping medium.

After the stripped contaminants are removed from the water by the steam and inert gas they are passed through absorber means where the contaminants are preferentially removed from the inert gas usually by dissolution in a solvent. Some systems use separate recovery systems for each contaminant while others use a single unit to recover all shipped contaminants. Typical solvents are amines such as mono-ethanol amine and diethanol amine, for example. The methods of absorption of gases such as ammonia and hydrogen sulfide are well known to those skilled in the art. Also, since the process of my invention has a reflux drum temperature of about 100° F. compared with 180° F. for steam alone there is better absorption of the contaminating gases by the absorbers downstream and less water is available to contaminate the absorber solvents.

After the absorbers have removed the other gases the inert gas is returned to the stripping tower by means of a compressor to be reused in removing carbon dioxide, ammonia and hydrogen sulfide from water. Thus, the high utility cost for steam stripping is reduced. A lower utility cost for power to drive the compressor is substituted. On the basis of 50 cents/1,000 lb. for steam, and 1 cent/KWH for power, utility costs are reduced as inert gas is substituted for steam. For each 1,000 lbs/hr. of steam that is replaced with inert gas, utility cost is reduced by 30 cents/hr. Even if the inert gas is slightly less efficient than steam the cost savings would be substantial. The reason for possible less efficiency of the inert gas lies in the fact that the inert gas being recycled to the stripping tower may obtain minute amounts of contaminants depending on the efficiency of the absorbers. In order that the water leaving the bottom of the tower may be completely free of contaminants the recycled inert gas should be introduced a few trays up from the bottom of the stripping tower. Pure inert gas could be introduced at the bottom of the stripping tower and no efficiency loss would occur.

In addition to stripping steam some additional heat may be needed, from any convenient source, to heat the contaminants water feed up to the bottoms temperature of the stripping tower. For a stripper operating at 20 PSIG at the bottom, stripper bottoms temperatures would range from about 260° F. with very little inert gas being used to about 150° F. with a large percentage of inert gas being used. Equivalent feed temperature for the contaminated water would then be about 225° F. to about 120° F.

TABLE A
Calculated Conditions for Mixtures of Inert Gas and Steam for Sour Water Stripper

| | Inert gas and steam | | | | | | | Steam only |
|---|---|---|---|---|---|---|---|---|
| STRIPPING MEDIUM | | | | | | | | |
| Nitrogen, mph* | 300 | 600 | 900 | 1200 | 1500 | 1800 | 1980 | 0 |
| Steam, mph* | 1900 | 1600 | 1300 | 1000 | 700 | 400 | 220 | 2200 |
| Total | 2200 | 2200 | 2200 | 2200 | 2200 | 2200 | 2200 | 2200 |
| Mol percent steam | 86.5 | 72.8 | 59.1 | 45.5 | 31.8 | 18.2 | 10.0 | 100.0 |
| Partial pressure steam | 28.5 | 24.0 | 19.5 | 14.8 | 10.5 | 6.0 | 3.3 | 33.0 |
| Bottom temp., °F | 247 | 238 | 226 | 213 | 195 | 170 | 145 | 256 |
| Reflux drum temp., °F | 100 | 100 | 100 | 100 | 100 | 100 | 100 | 180 |
| OVERHEAD PRODUCT (DRY BASIS) | | | | | | | | |
| Ammonia, mph* | 82 | 82 | 82 | 82 | 82 | 82 | 82 | 82 |
| Hydrogen sulfide, mph* | 68 | 68 | 68 | 68 | 68 | 68 | 68 | 78 |

TABLE A—Continued
Calculated Conditions for Mixtures of Inert Gas and Steam for Sour Water Stripper

|  | Inert gas and steam | | | | | | | Steam only |
|---|---|---|---|---|---|---|---|---|
| Carbon dioxide, mph* | 4 | 4 | 4 | 4 | 4 | 4 | 4 | 4 |
| Nitrogen, mph* | 300 | 600 | 900 | 1200 | 1500 | 1800 | 1980 | 0 |
| Total | 454 | 754 | 1054 | 1354 | 1654 | 1954 | 2134 | 154 |
| Mol percent water in vapor | 3.52 | 3.52 | 3.52 | 3.52 | 3.52 | 3.52 | 3.52 | 27.8 |
| Mph* water | 16.5 | 27.5 | 38.2 | 49.0 | 58.0 | 69.0 | 78.5 | 5.9 |
| Ttoal | 470 | 781 | 1092 | 1403 | 1714 | 2025 | 2232 | 213 |
| MOL PERCENT OVERHEAD PRODUCT COMPOSITION | | | | | | | | |
| Ammonia | 17.5 | 10.5 | 7.5 | 5.8 | 4.8 | 4.0 | 3.7 | 38.5 |
| Hydrogen sulfide | 14.5 | 8.7 | 6.2 | 4.8 | 3.9 | 3.4 | 3.0 | 31.8 |
| Carbon dixode | 0.8 | 0.5 | 0.4 | 0.3 | 0.2 | 0.2 | 0.2 | 1.9 |
| Nitrogen | 63.7 | 76.8 | 82.4 | 85.6 | 90.6 | 88.9 | 89.6 | 0 |
| Water | 3.5 | 3.5 | 3.5 | 3.5 | 3.5 | 3.5 | 3.5 | 27.8 |
| Total | 100.0 | 100.0 | 100.0 | 100.0 | 100.0 | 100.0 | 100.0 | 100.0 |

* Moles per hour.

I claim:

1. A process for removing gaseous contaminants from water which comprises:
   stripping the contaminants from the water with a mixture of an inert gas and steam and,
   recovering the inert gas and repeating the stripping process continuously.

2. A process as in claim 1 wherein the amount of steam relative to the total of steam and inert gas is from about 10 mole percent to about 85 mole percent.

3. The process of claim 1 wherein the inert gas is nitrogen.

4. The process of claim 1 wherein the water contaminants include hydrogen sulfide and ammonia.

5. A process for removing gaseous contaminants from water which comprises stripping the gaseous contaminants from the water with steam and inert gas, said inert gas flowing in a closed path wherein the inert gas is continuously reused for stripping.

6. The process of claim 5 wherein the amount of steam relative to the total of steam and inert gas is from about 10 mole percent to about 85 mole percent.

7. The process of claim 6 wherein the inert gas is nitrogen.

8. The process of claim 5 wherein the contaminants include hydrogen sulfide and ammonia.

9. The process of claim 5 wherein the inert gas is freed of the contaminants picked up in the stripping process by contacting the inert gas and contaminants with a solvent system which will selectively dissolve only the contaminants.

* * * * *